Nov. 9, 1926.
A. B. UTLEY
1,606,274
TANK FILLING VALVE
Filed Sept. 24, 1925
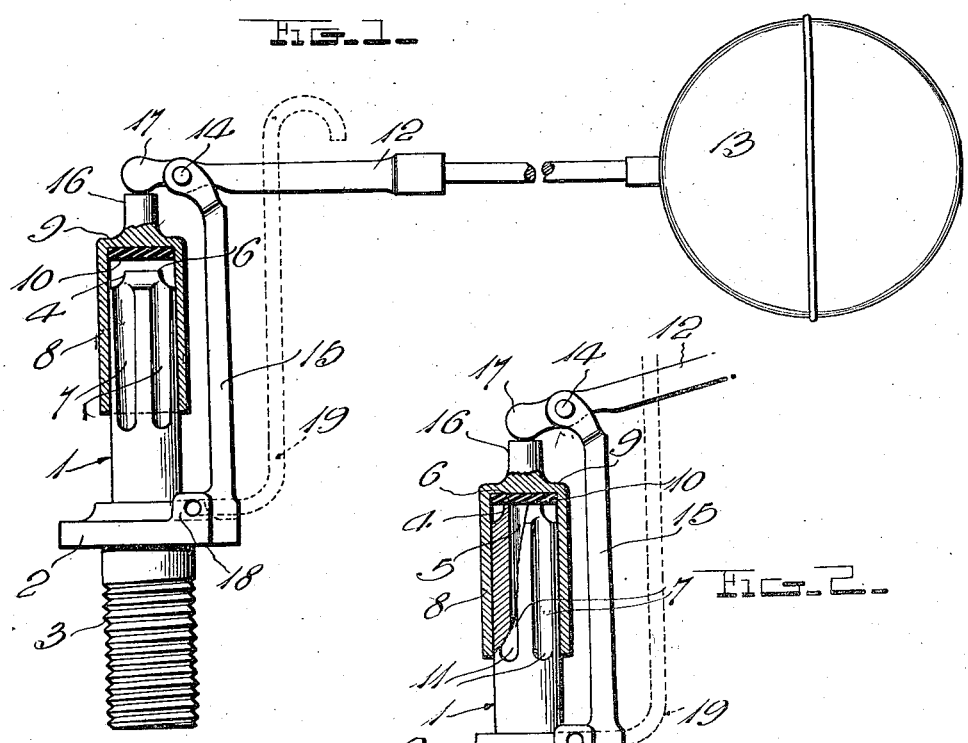
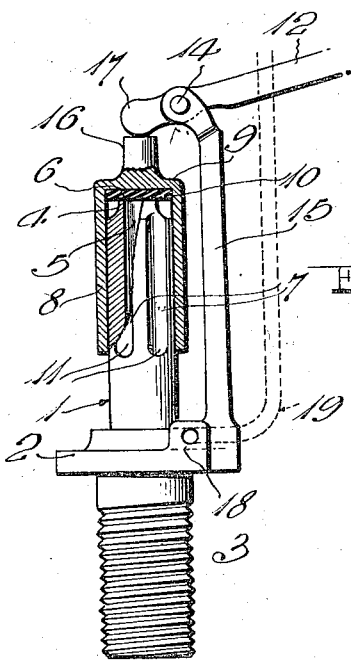
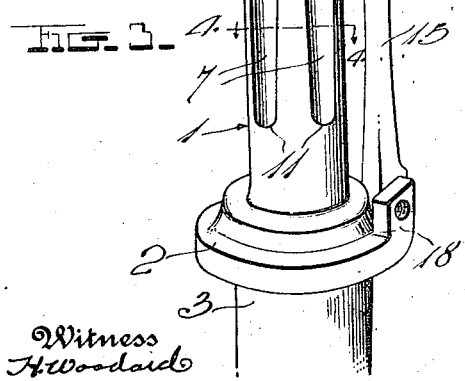
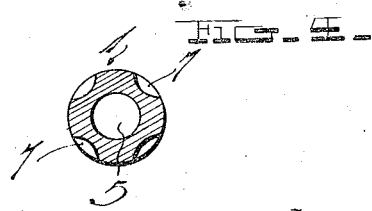
Inventor
A. B. Utley Patented Nov. 9, 1926.

1,606,274

UNITED STATES PATENT OFFICE.

ARTHUR B. UTLEY, OF SPRINGFIELD, MISSOURI.

TANK-FILLING VALVE.

Application filed September 24, 1925. Serial No. 58,381.

My invention relates to improvements in float-controlled tank filling valves, commonly known as ball cocks, and the object of such invention is to provide an exceptionally simple and inexpensive, yet an efficient and reliable valve of this character, which will be substantially noiseless when in operation for admitting water to a tank.

With the foregoing in view, the invention resides in the novel subject matter hereinafter described and claimed, the description being supplemented by the accompanying drawing.

Figure 1 is a side elevation partly in section showing the valve in open position.

Figure 2 is a view similar to Fig. 1 but illustrating the valve closed.

Figure 3 is a perspective view of the main body of the device.

Figure 4 is a detail horizontal sectional view on line 4—4 of Fig. 3.

In the drawing above briefly described, the numeral 1 designates an elongated, tubular passage member having an enlargement 2 between its ends to rest upon a tank bottom, one end portion of said passage member being threaded as indicated at 3 to receive means for securing it in place and for connecting it with a water supply pipe. The other end of the passage member 1 is preferably reduced as indicated at 4, is formed with a water discharge orifice 5, and is shaped to provide a valve seat 6 around said orifice. The exterior of the member 1, between the enlargement 2 and the seat 6, is formed with a plurality of longitudinal groovs 7, and slidably surrounding this grooved portion of the member 1 is a sleeve 8, this sleeve being provided with a closed end 9 against which a valve gasket 10 bears, said gasket being adapted for co-action with the seat 6. When the sleeve 8 is moved so that the gasket disengages the seat as shown in Fig. 1, water from the passage member 1 may discharge downwardly through the grooves 7 and into the tank, but when the sleeve 8 is held in the lowered position of Fig. 2, discharge of water from the member 1 into the tank is prevented. As the sleeve reaches the valve-closed position, its inner end substantially covers and almost, if not entirely, closes the inner ends 11 of the grooves 7, and this relation and operation tends greatly to produce a substantially noiseless valve. Also, I have found in practice, that having the lower edge of the sleeve disposed at the lower ends of the grooves as the valve closes, gives the latter a quick, positive action as well as making the operation noiseless.

For controlling the movements of the sleeve 8, a lever 12 is provided having an appropriate float 13, said lever being fulcrumed at 14 to a post 15 which rises from and is integral with the enlargement 2. The closed end 9 of the sleeve 8 is preferably provided with an integral projection 16 for co-action with the adjacent end of the lever 12, which end is preferably rounded as indicated at 17.

Preferably, the enlargement 2 is formed with a lug 18 having an opening in which an after flow pipe 19 is threaded, said pipe receiving some of the water discharged downwardly from the sleeve 8 and serving to carry it to the usual overflow pipe which commonly forms a part of the flush valve for the tank.

By providing the novel construction shown and described or a substantial equivalent thereof, a float-controlled valve is produced which is exceptionally simple and inexpensive, may be easily manufactured, may be installed with ease, will operate with great efficiency, and will be practically noiseless. On account of these advantages for the details disclosed, such details are preferably followed. However, within the scope of the invention as claimed, modifications may be made.

I claim:

A tank filling valve comprising an elongated tubular passage member having a liquid discharge orifice at one end and a valve seat around said orifice, a sleeve slidably surrounding said passage member and having a valve co-operable with said seat, said passage member having longitudinal external liquid-conducting grooves extending from its seat-equipped end, the inner ends of said grooves being substantially covered and closed by said sleeve as the latter moves to final valve-closed position, and float-controlled means for sliding said sleeve to seat said valve.

In testimony whereof I have hereunto affixed my signature.

ARTHUR B. UTLEY.